No. 876,483.
PATENTED JAN. 14, 1908.
W. D. MYERS.
BEER TAP.
APPLICATION FILED JULY 1, 1907.
2 SHEETS—SHEET 1.
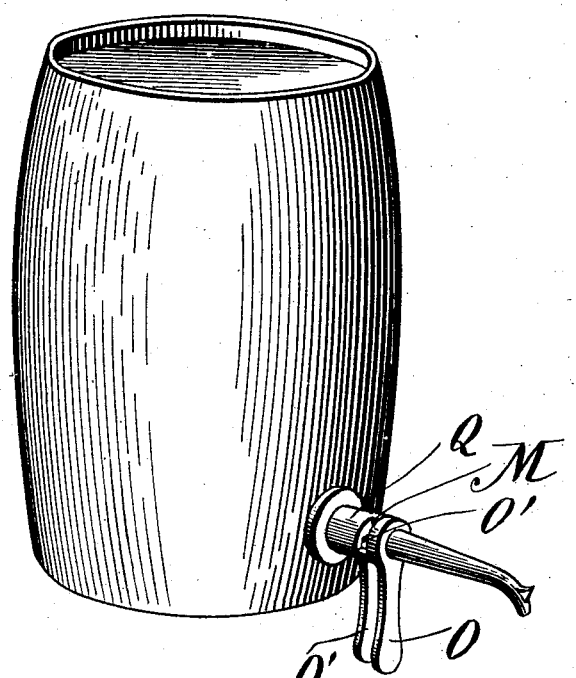
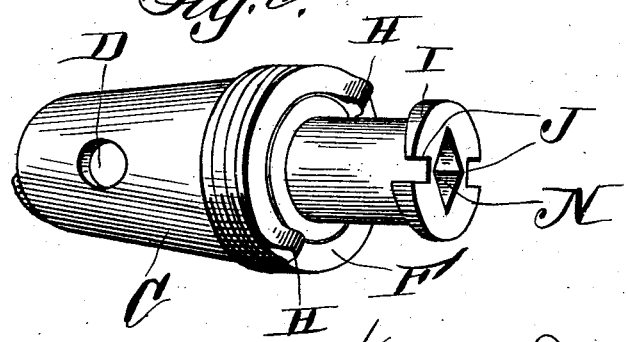
Witnesses
Inventor
William D. Myers,
By Franklin H. Hough
Attorney

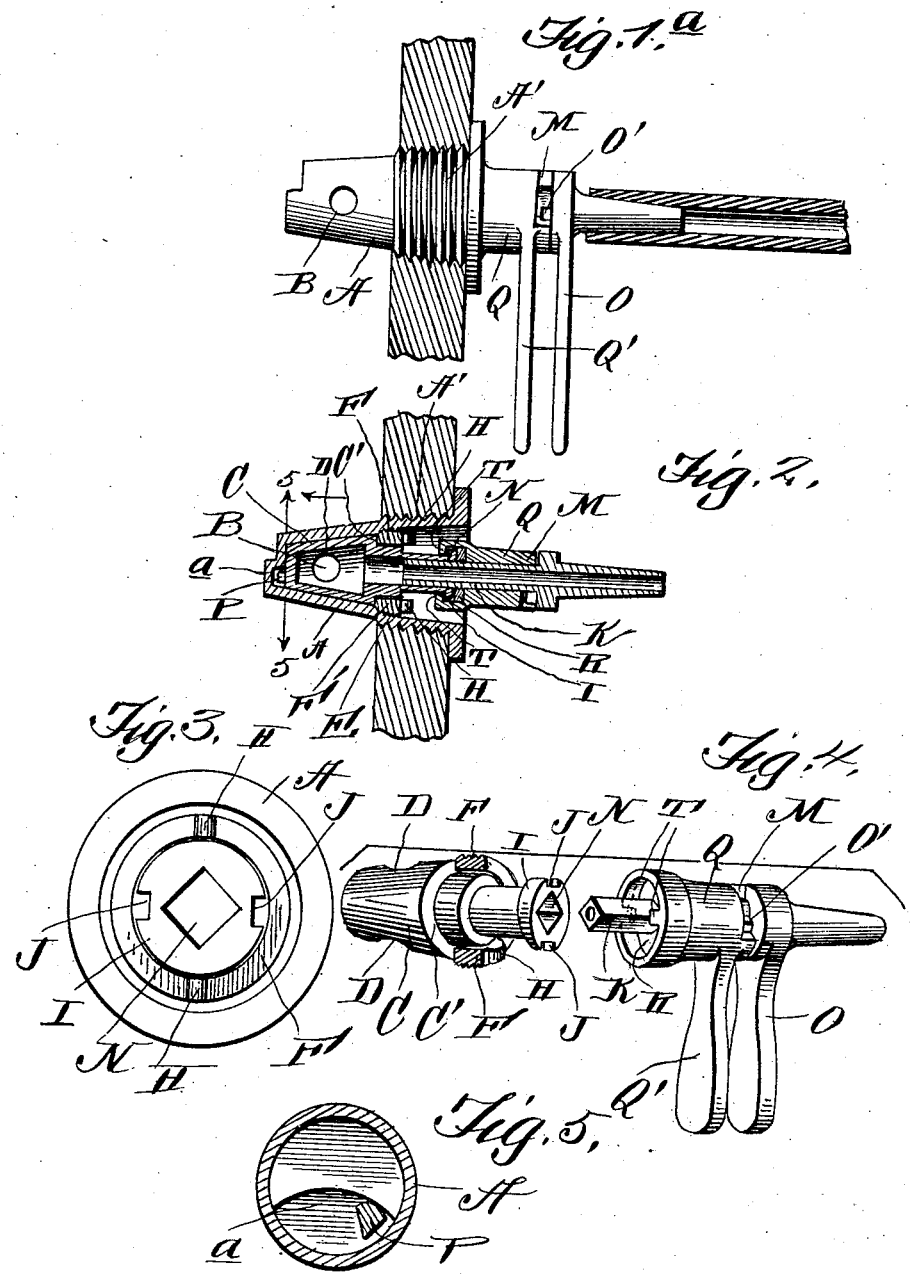

UNITED STATES PATENT OFFICE.

WILLIAM DAVID MYERS, OF CANTON, OKLAHOMA, ASSIGNOR OF ONE-HALF TO E. C. FRAZIER, OF CANTON, OKLAHOMA.

BEER-TAP.

No. 876,483.   Specification of Letters Patent.   Patented Jan. 14, 1908.

Application filed July 1, 1907. Serial No. 381,802.

*To all whom it may concern:*

Be it known that I, WILLIAM DAVID MYERS, a citizen of the United States, residing at Canton, in the county of Blaine, Oklahoma, have invented certain new and useful Improvements in Beer-Taps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in beer taps or bushings and valves for barrels, tanks, etc., and comprises various details of construction and combinations and arrangements of parts which will be hereinafter fully described and then specifically defined in the appended claims.

My invention is illustrated in the accompanying drawings, which, with the letters of reference marked thereon, form a part of this application, and in which:—

Figure 1 is a perspective view of my invention. Fig. 1ª is a side elevation of the tap showing a tube in section connected therewith. Fig. 2 is a vertical sectional view longitudinally through the tap. Fig. 3 is an end view of the bushing and valve mounted therein. Fig. 4 is a perspective view showing parts of the invention disassembled. Fig. 5 is a sectional view on line 5—5 of Fig. 2 and Fig. 6 is a detail perspective view of a shell forming a part of the tap.

Reference now being had to the details of the drawings by letter, A designates a bushing having a thread A' about the circumference thereof adapted to fit threads about a bung hole or aperture in any receptacle. Said bushing is made in the form of a cup having apertures B formed in the wall thereof and the inner surface of the bushing has a tapering valve seat adapted to receive the plug valve C, which is hollow and provided with openings D adapted to register with the openings in the wall of the bushing when said plug is turned to a certain position. Threads E are formed upon the inner surface of said bushing and are adapted to receive the threads F of the ring F', which is adapted to hold the valve to its seat. Said valve has a shoulder C' about its circumference against which said ring is adapted to bear. Lugs H project from the outer edge of said threaded ring at positions diametrically opposite and form means whereby a spanner wrench may be utilized for adjusting the ring in place or unscrewing the same. Said valve has an angular outlined opening N in one end thereof for the reception of the angular outlined tubular stem K, said stem serving two purposes, one for rotating the valve and the other for forming a passageway through which the liquid to be dispensed from the receptacle to which the bushing is attached may be drawn over. In the drawings, I have shown the outer portion of said tubular stem adapted to receive a hose pipe, whereby the drippings from the device may be conveyed away. O designates a handle which is fixed to said tubular stem and O' is a lug projecting from said handle and is adapted to have a play in a recess M formed in the face of the shell Q, which shell has an integral handle Q' projecting therefrom. A disk R is fixed to said tubular stem and bears against a shoulder formed within said shell and serves as means for holding said shell upon the tubular stem and in such relation to said handle O that the lug projecting from the latter will limit the rotary movement of the tubular stem, said handle O allowing the stem to make a quarter of a revolution independent of the shell. One end of said shell is provided with diametrically opposite lugs T and said washer disk is also provided with diametrically opposite slots or recesses whereby the washer may be placed upon the stem without interference from said lugs.

Referring to the end view of the bushing in which the valve is seated, it will be observed that recesses J are formed at locations diametrically opposite each other and adapted to receive the lugs T when in registration therewith. The outer end of said valve has a flange I adapted to prevent the shell from being detached from the valve when the lugs upon the shell are out of registration with the recesses in said flange. The inner end of said valve is provided with a lug P which is adapted to have a play in a recess *a* formed in the bottom of the cup bushing, whereby said valve may be allowed to have only a partial revolution sufficient to allow the apertures in the wall of the valve to be brought into registration or out of registration with the holes in the wall of the bushing.

In operation, the bushing being screwed into the threaded opening of a barrel or other receptacle and the valve first being adjusted in place and swivelly held therein by means of said threaded ring, the inner end of the tubular stem is inserted in the angular outlined opening in the valve and the lugs T are brought so that they will register with the diametrically opposite recesses formed in the flange at the end of the valve and, after the said lugs have passed through said recesses, a partial revolution is imparted to the shell which will cause said lugs to engage said flange and hold the shell upon the valve. The parts being thus adjusted, the apertures in the plug may be brought into registration with the apertures in the wall of the bushing by giving a one quarter rotary movement to the stem, whereby the liquid may be dispensed. By a reverse partial rotary movement to said stem through the medium of the handle fixed thereto, the apertures leading through the wall of the bushing may be closed thereby shutting off the supply of liquid and, in the event of it being desired to remove the bushing and tubular stem, the handle upon the shell is given a backward movement of one quarter of a revolution while the handle upon the stem is at rest and each movement of the shell will bring the lugs thereon into registration with the slots formed at positions diametrically opposite in the flange of the valve, thereby allowing the shell and stem to be detached from the bushing and valve without turning the latter.

From the foregoing, it will be seen that, by the provision of a tap and faucet as shown and described, simple and efficient means is afforded for dispensing liquid from a receptacle and afterwards detaching the operating means for turning the valve.

What I claim is:—

1. A combined bushing and faucet for receptacles comprising a cup-shaped bushing having a threaded circumference and provided with apertures in the wall thereof, a plug valve seated within said bushing and provided with apertures adapted to be brought into registration with the apertures in the wall of the bushing, a threaded ring engaging threads on the inner surface of the bushing and adapted to hold the valve swivelly within the latter, a tubular stem having an angular outlined portion adapted to engage an angular opening in said valve, a handle upon said stem, a lug projecting therefrom, a shell swiveled upon said stem and recessed to receive said lug to limit the rotary movement of the stem independent of said shell, a handle upon said shell, and means for locking the shell to said valve, as set forth.

2. A combined bushing and faucet for receptacles, comprising a cupshaped bushing having a threaded circumference and provided with apertures in the wall thereof, a flanged valve seated within said bushing and provided with apertures adapted to be brought into registration with the apertures in the wall of the bushing, a threaded ring engaging threads on the inner surface of the bushing and adapted to hold the flanged valve swivelly within the latter, tubular stem having an angular outlined portion adapted to engage an angular opening in said flanged valve, a handle upon said stem, a lug projecting therefrom, a shell swiveled upon said stem and recessed to receive said lug to limit the rotary movement of the stem independent of said shell, a handle upon said shell, means for locking the shell to said valve, consisting of lugs projecting from said shell and adapted to engage behind the flange of the valve to hold the inner end of the stem in the aperture of the valve, as set forth.

3. A combined bushing and faucet for receptacles, comprising a cupshaped bushing having a threaded circumference and provided with apertures in the wall thereof, a flanged valve seated within said bushing and provided with apertures adapted to be brought into registration with the apertures in the wall of the bushing, a threaded ring engaging the inner surface of the bushing and adapted to hold the flanged valve swivelly within the latter, tubular stem having an angular outlined portion adapted to engage an angular opening in said flanged valve, a handle upon said stem, a lug projecting therefrom, a shell swiveled upon said stem and recessed to receive said lug to limit the rotary movement of the stem independent of said shell, a handle upon said shell, diametrically opposite lugs projecting from the inner surface of said shell adapted to be brought into registration with diametrically opposite recesses in the flange of the valve, said lugs upon the shell coöperating with the flange of the valve to hold the stem in said valve, as set forth.

In testimony whereof I hereunto affix my signature in the presence of two witnesses.

WILLIAM DAVID MYERS.

Witnesses:
ARTHUR GRAY,
SAM P. WILLIS.